United States Patent
Watanabe et al.

(10) Patent No.: US 11,142,887 B2
(45) Date of Patent: Oct. 12, 2021

(54) HYBRID WORKING MACHINE

(71) Applicant: Hitachi Construction Machinery Co., Ltd., Tokyo (JP)

(72) Inventors: Akira Watanabe, Ushiku (JP); Ken Takeuchi, Kasumigaura (JP); Tadashi Osaka, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/644,288

(22) PCT Filed: Jul. 23, 2018

(86) PCT No.: PCT/JP2018/027462
§ 371 (c)(1),
(2) Date: Mar. 4, 2020

(87) PCT Pub. No.: WO2019/058741
PCT Pub. Date: Mar. 28, 2019

(65) Prior Publication Data
US 2021/0062467 A1    Mar. 4, 2021

(30) Foreign Application Priority Data
Sep. 21, 2017   (JP) .............................. JP2017-181143

(51) Int. Cl.
*E02F 9/00*    (2006.01)
*E02F 9/08*    (2006.01)
*E02F 9/20*    (2006.01)

(52) U.S. Cl.
CPC .......... *E02F 9/0866* (2013.01); *E02F 9/2075* (2013.01)

(58) Field of Classification Search
CPC .......... B60L 58/28; B60L 58/24; B60L 58/27; B60K 4/04; B60K 6/22; B60H 1/08;
(Continued)

(56) References Cited

U.S. PATENT DOCUMENTS 6,357,541 B1 *   3/2002   Matsuda ................... B60K 6/22
                                                    180/68.2
6,464,027 B1 *   10/2002  Dage .................. B60H 1/00492
                                                    180/65.22
(Continued)

FOREIGN PATENT DOCUMENTS

EP    3 176 334 A1      6/2017
JP    11-313406 A       11/1999
(Continued)

OTHER PUBLICATIONS

International Search Report (PCT/ISA/210) issued in PCT Application No. PCT/JP2018/027462 dated Oct. 2, 2018 with English translation (four (4) pages).
(Continued)

*Primary Examiner* — Hau V Phan
(74) *Attorney, Agent, or Firm* — Crowell & Moring LLP

(57) ABSTRACT

An engine cooling system (22) includes an engine (11), an engine cooling pipe line (23), an engine water pump (24) and an engine radiator (25). An electricity storage device cooling system (27) includes an electricity storage device (19), an electricity storage device cooling pipe line (28), an electricity storage device water pump (29) and an electricity storage device radiator (31). Different heat-transfer media (engine cooling water and electricity storage device cooling water) flow respectively in the engine cooling system (22) and the electricity storage device cooling system (27). Further, a heating heat exchanger (32) is provided in the halfway of the engine cooling pipe line (23) and in the halfway of the electricity storage device cooling pipe line (28) for performing heat exchange between the engine cooling water and the electricity storage device cooling water.

2 Claims, 6 Drawing Sheets

(58) Field of Classification Search
CPC ....... B60H 1/005; B60H 1/143; E02F 9/0866; E02F 9/2075
USPC .................................................... 180/65.21
See application file for complete search history.

(56) References Cited

U.S. PATENT DOCUMENTS

| | | | | |
|---|---|---|---|---|
| 6,705,101 B2* | 3/2004 | Brotz | ................... | B60H 1/143 62/198 |
| 6,899,162 B2* | 5/2005 | Hohl | ...................... | F01P 7/165 123/41.29 |
| 7,147,071 B2* | 12/2006 | Gering | .................... | B60L 58/27 237/12.3 B |
| 7,628,125 B2* | 12/2009 | Kaita | ...................... | F02D 13/06 123/41.31 |
| 8,191,618 B2* | 6/2012 | Gering | .................... | B60H 1/08 165/202 |
| 8,639,422 B2* | 1/2014 | Ota | ...................... | E02F 9/2091 701/50 |
| 8,895,172 B2* | 11/2014 | Axelsson | ............... | B60L 58/24 429/120 |
| 9,242,530 B2* | 1/2016 | Goenka | .................. | B60H 1/005 |
| 9,533,546 B2* | 1/2017 | Cheng | ................... | B60K 1/04 |
| 9,533,551 B2* | 1/2017 | Cheng | ................ | B60H 1/00428 |
| 9,664,415 B2* | 5/2017 | Kishi | ................. | F24D 19/1021 |
| 9,682,608 B2* | 6/2017 | Goenka | .............. | B60H 1/32281 |
| 9,954,260 B2* | 4/2018 | Ho | .......................... | B60L 58/26 |
| 2001/0040061 A1 | 11/2001 | Matuda et al. | | |
| 2004/0069012 A1 | 4/2004 | Inoue | | |
| 2005/0167169 A1 | 8/2005 | Gering et al. | | |
| 2013/0299256 A1 | 11/2013 | Yamashita | | |
| 2017/0284062 A1 | 10/2017 | Osaka et al. | | |

FOREIGN PATENT DOCUMENTS

| | | |
|---|---|---|
| JP | 2001-37009 A | 2/2001 |
| JP | 2004-131034 A | 4/2004 |
| JP | 2012-154092 A | 8/2012 |
| JP | 2016-160843 A | 9/2016 |

OTHER PUBLICATIONS

Japanese-language Written Opinion (PCT/ISA/237) issued in PCT Application No. PCT/JP2018/027462 dated Oct. 2, 2018 (five (5) pages).
Extended European Search Report issued in European Application No. 18857790.2 dated Jul. 26, 2021 (eight (8) pages).

* cited by examiner

HYBRID WORKING MACHINE

TECHNICAL FIELD

The present invention relates to hybrid working machines such as hydraulic excavators, hydraulic cranes or wheel loaders on each of which, for example, an engine, an electric motor and an electricity storage device are mounted.

BACKGROUND ART

For example, a hybrid working machine such a hybrid excavator operates using power stored in an electricity storage device as a power source. In such a hybrid working machine, a storage battery such as a lithium-ion battery, which configures the electricity storage device, generates heat with charge and discharge cycles, and therefore, the hybrid working machine is provided with a cooling device for cooling the storage battery. That is, in a case where a use upper limit temperature of the storage battery is 50° C., for example, the storage battery is used while being cooled with the cooling device in order to prevent a temperature of the storage battery from going beyond the use upper limit temperature. However, in a case where the temperature increases close to the use upper limit temperature regardless of cooling the storage battery, the storage battery is protected by limiting the charge and discharge amount of the storage battery. When a state where the temperature of the storage battery is beyond the use upper limit temperature continues, degradation of the storage battery is progressed, possibly leading to a reduction in a lifetime thereof, which is therefore, not preferable.

On the other hand, since performance of the storage battery is deteriorated caused by a lowered temperature, it is necessary to heat and use the storage battery for acquiring a sufficient power source even under a lowered-temperature environment. Here, an automobile can use air within a vehicle compartment space to perform warming-up (heating) of the storage battery. In contrast to it, in many cases a working machine cannot use air within a cab for the warming-up of the storage battery because "the working machine does not necessarily use an air conditioner within the cab", "the working machine mostly operates in a construction site where many dusts are contained in air", or the like. Therefore, it is being considered to use engine cooling water for the warming-up of the storage battery in the working machine (Patent Document 1).

A hybrid construction machine as described in Patent document 1 is provided with a warming-up switching valve in a flow passage in an engine cooling system. In this case, the warming-up switching valve has a switch position for supplying engine cooling water to an electricity storage device, and the storage battery can be heated with the engine cooling water by switching the warming-up switching valve to this position.

PRIOR ART DOCUMENT

Patent Document

Patent Document 1: Japanese Patent Laid-Open No. 2012-154092 A

SUMMARY OF THE INVENTION

According to the technology as described in Patent Document 1, the engine cooling water is supplied to the electricity storage device through a pathway directly branched from the engine cooling system. That is, in a case of the technology as described in Patent Document 1, an engine and the electricity storage device use a common cooling water circulation system. Therefore, for example, in a case where the cooling water is leaked in the electricity storage device, there is a possibility that not only the engine cooling water to be supplied to the electricity storage device runs out but also the engine or other equipment devices using the engine cooling water cannot be cooled.

Here, in consideration of an actual layout of a vehicle body in the working machine, since the electricity storage device is not necessarily disposed close to the engine, it is required to arrange a cooling pipe line having a long pathway between the engine and the electricity storage device. For example, there will be considered the layout where the engine is mounted on a central part in the rear side of the vehicle body, an engine radiator is mounted on a left rear side of the vehicle body, the electricity storage device is mounted on a right front side of the vehicle body and a heater core is provided in a cab mounted on a left front side of the vehicle body. In this case, the pipe line of the engine cooling water is arranged to connect all of the four equipment devices.

Specifically, the cooling pipe line of the engine cooling water which has passed through the inside of the engine and has flowed out from the engine is to be branched into three directions from the central part of the vehicle body rear side. In this case, a pathway of the engine cooling water by the first branch goes toward the electricity storage device in the vehicle body right front side and through the electricity storage device, and then returns back to the upstream side of the engine. A pathway of the engine cooling water by the second branch goes toward the heater core within the cab in the vehicle body left front side and through the heater core, and then returns back to the upstream side of the engine. A pathway of the engine cooling water by the third branch goes toward the engine radiator in the vehicle body left rear side and through the engine radiator, and then returns back to the upstream side of the engine. In this way, according to the conventional technology, in a case of making an application for the actual vehicle body, the cooling pipe line having the long pathway is required, highly possibly leading to occurrence of the cooling water leakage in the cooling pipe line.

In addition, according to the conventional technology the engine cooling water is configured to flow directly into the electricity storage device. Here, a temperature of the engine cooling water is in a range of approximately 80° C. to 99° C. On the other hand, in a case where the electricity storage device is formed of a lithium-ion battery, the use upper temperature is in a range of approximately 50° C. to 60° C. Therefore, in a case of using the engine cooling water directly to the warming-up of the electricity storage device, it is required to accurately control the warming-up switch valve that supplies the engine cooling water to the electricity storage device side in a way not to rise up beyond the use upper limit temperature of the electricity storage device.

An object of the present invention is to provide a hybrid working machine that can reduce a risk of leakage of a heat-transfer medium (a cooling or heat medium) and easily perform adjustment of a temperature of the heat-transfer medium for warming-up an electricity storage device.

A hybrid working machine according to the present invention comprises: an automotive vehicle body on which a working mechanism is attached; an engine mounted on the vehicle body; an electric motor that is driven and rotated by the engine to generate power or assists in a drive of the engine with supply of power; an electricity storage device that stores the power generated by the electric motor or supplies the stored power to the electric motor; an engine cooling pipe line in which an engine heat-transfer medium for cooling the engine flows; an engine cooling pump that delivers the engine heat-transfer medium to the engine cooling pipe line; an engine radiator that is connected via the engine cooling line to the engine to perform heat release of the engine heat-transfer medium; an electricity storage device cooling pipe line in which an electricity storage device heat-transfer medium for cooling the electricity storage device flows; an electricity storage device cooling pump that delivers the electricity storage device heat-transfer medium to the electricity storage device cooling pipe line; and an electricity storage device radiator that is connected via the electricity storage device cooling pipe line to the electricity storage device to perform heat release of the electricity storage device heat-transfer medium, characterized in that: an engine cooling system including the engine, the engine cooling pipe line, the engine cooling pump and the engine radiator, and an electricity storage device cooling system including the electricity storage device, the electricity storage device cooling pipe line, the electricity storage device cooling pump and the electricity storage device radiator are configured as different cooling systems in which different heat-transfer media respectively flow; and a heat-transfer medium heat exchanger is provided for performing heat exchange between the engine heat-transfer medium and the electricity storage device heat-transfer medium.

According to the present invention, the risk of the leakage of the heat-transfer medium (cooling medium and heat medium) can be made low and the adjustment of the temperature of the electricity storage device for warming-up the electricity storage device can be easily performed.

MODE FOR CARRYING OUT THE INVENTION

Hereinafter, an explanation will be in detail made of an embodiment of a hybrid working machine according to the present invention with reference to the accompanying drawings by taking a case of being applied to a hybrid hydraulic excavator as an example. It should be noted that each step in a flowchart shown in FIG. 7 uses notation of "S" (for example, step 1="S1").

Figure 1:
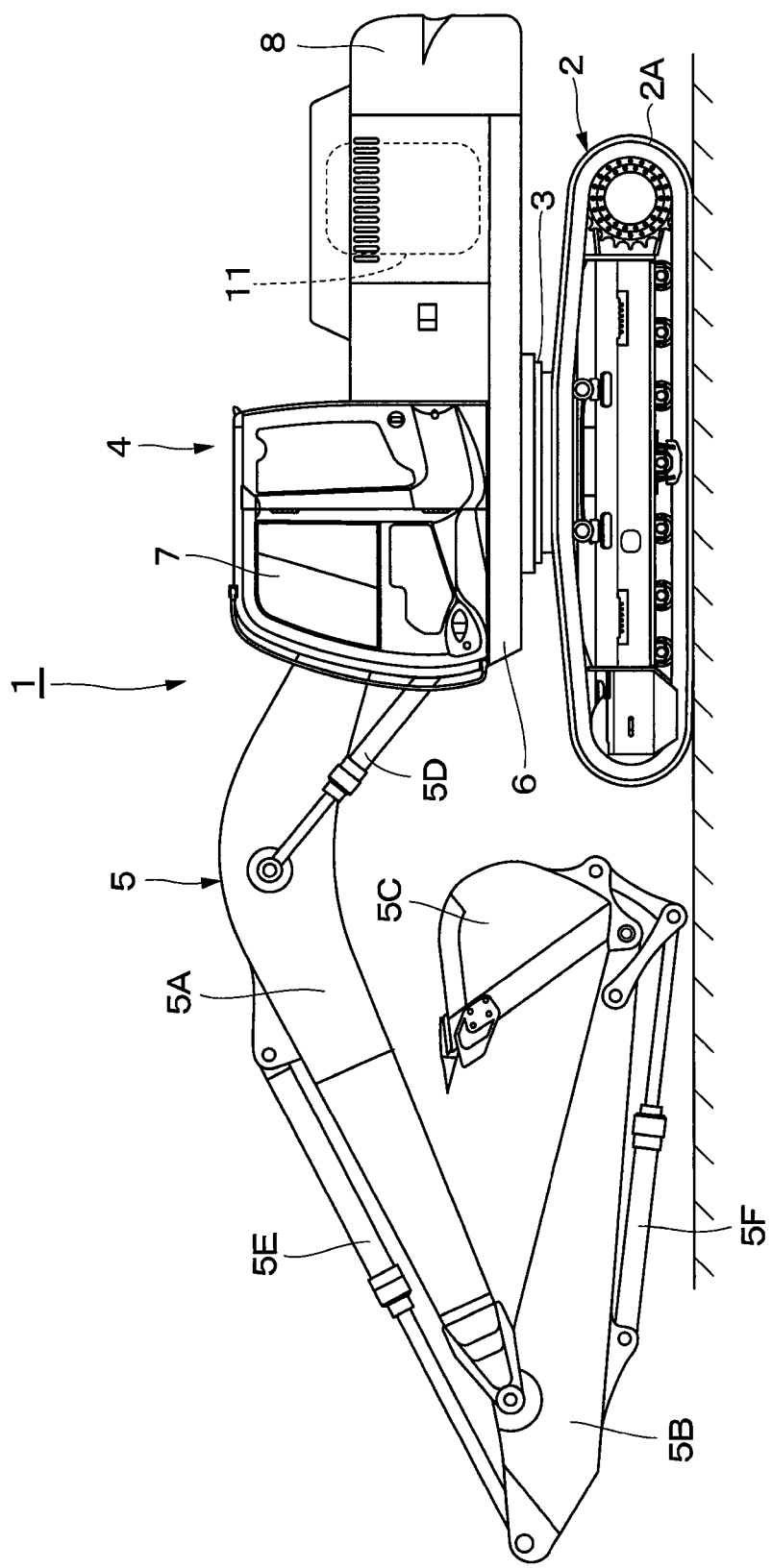
FIG. 1 is a front view showing a hybrid hydraulic excavator according to an embodiment of the present invention.

In FIG. 1, a hybrid hydraulic excavator 1 (hereinafter, referred to as "hydraulic excavator 1") as a representative example of a hybrid working machine is provided with an engine 11 and an assist power generation motor 15 (refer to FIG. 2 to FIG. 6) as an electric motor, and an electricity storage device 19 (refer to FIG. 2 to FIG. 6), which will be described later. That is, the hydraulic excavator 1 includes an automotive lower traveling structure 2 of a crawler type, a revolving device 3 that is provided on the lower traveling structure 2, an upper revolving structure 4 that is mounted through the revolving device 3 on the lower traveling structure 2 to be capable of revolving thereon, and a working mechanism 5 of an articulated structure that is provided in the front side of the upper revolving structure 4 and performs an excavating operation. In this case, the lower traveling structure 2 and the upper revolving structure 4 configure a vehicle body of the hydraulic excavator 1.

The lower traveling structure 2 includes, for example, crawler tracks 2A, and left and right traveling hydraulic motors 2B, 2C (refer to FIG. 2) causing the hydraulic excavator 1 to travel by causing the crawler tracks 2A to be driven and circulated. The lower traveling structure 2 travels together with the upper revolving structure 4 and the working mechanism 5 by rotation of the traveling hydraulic motors 2B, 2C as hydraulic motors (hydraulic actuators), based upon delivery of pressurized oil from a hydraulic pump 12 to be described later (refer to FIG. 2 to FIG. 5).

The working mechanism 5 called a working machine or a front is attached on the revolving frame 6 of the upper revolving structure 4. The working mechanism 5 is configured of, for example, a boom 5A, an arm 5B and a bucket 5C as a working tool, and a boom cylinder 5D, an arm cylinder 5E and a bucket cylinder (a working tool cylinder) 5F as hydraulic actuators (fluid-pressure actuators), which drive them. The working mechanism 5 performs a lifting/tilting operation by expansion or contraction of the cylinders 5D, 5E, 5F as hydraulic cylinders, based upon delivery of pressurized oil from the hydraulic pump 12.

The upper revolving structure 4 is mounted on the lower traveling structure 2 through the revolving device 3 including revolving bearings, a speed reducing mechanism, a revolving hydraulic motor 3A (refer to FIG. 2 to FIG. 5), and a revolving electric motor 20 (FIG. 2 to FIG. 5), which will be described later. The revolving hydraulic motor 3A as a hydraulic motor (a hydraulic actuator) rotates based upon delivery of pressurized oil from the hydraulic pump 12. The revolving electric motor 20 rotates based upon delivery of power from the electricity storage device 19. The upper revolving structure 4 revolves together with the working mechanism 5 on the lower traveling structure 2 with rotation of the revolving hydraulic motor 3A and/or the revolving electric motor 20.

Figure 2:
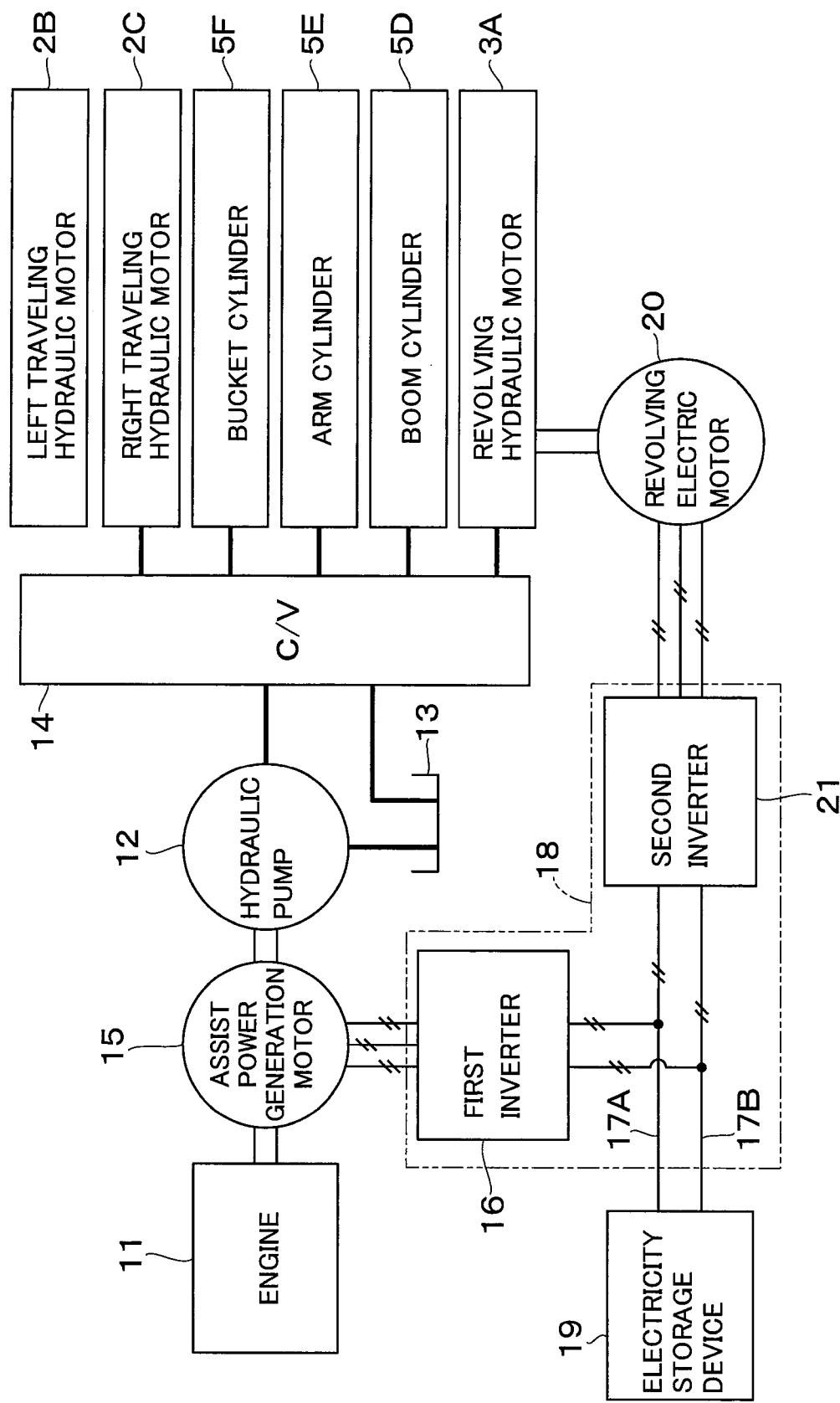
FIG. 2 is a block diagram showing a hydraulic system and an electric system that are applied to the hybrid hydraulic excavator in FIG. 1.

The upper revolving structure 4 includes a revolving frame 6 as a support structure (a base frame) of the upper revolving structure 4, a cab 7 mounted on the revolving frame 6, and a counterweight 8. In this case, the engine 11, the hydraulic pump 12, a hydraulic oil tank 13, a control valve device (C/V) 14, the assist power generation motor 15, an electricity storage device 19 and the like, which are shown in FIG. 2, are mounted on the revolving frame 6. The revolving frame 6 is attached via the revolving device 3 to the lower traveling structure 2. The cab 7 defining therein an operation room is provided in the front left side of the revolving frame 6. The counterweight 8 is located in the rear end side of the revolving frame 6 to act as a weight balance to the working mechanism 5.

Figure 3:
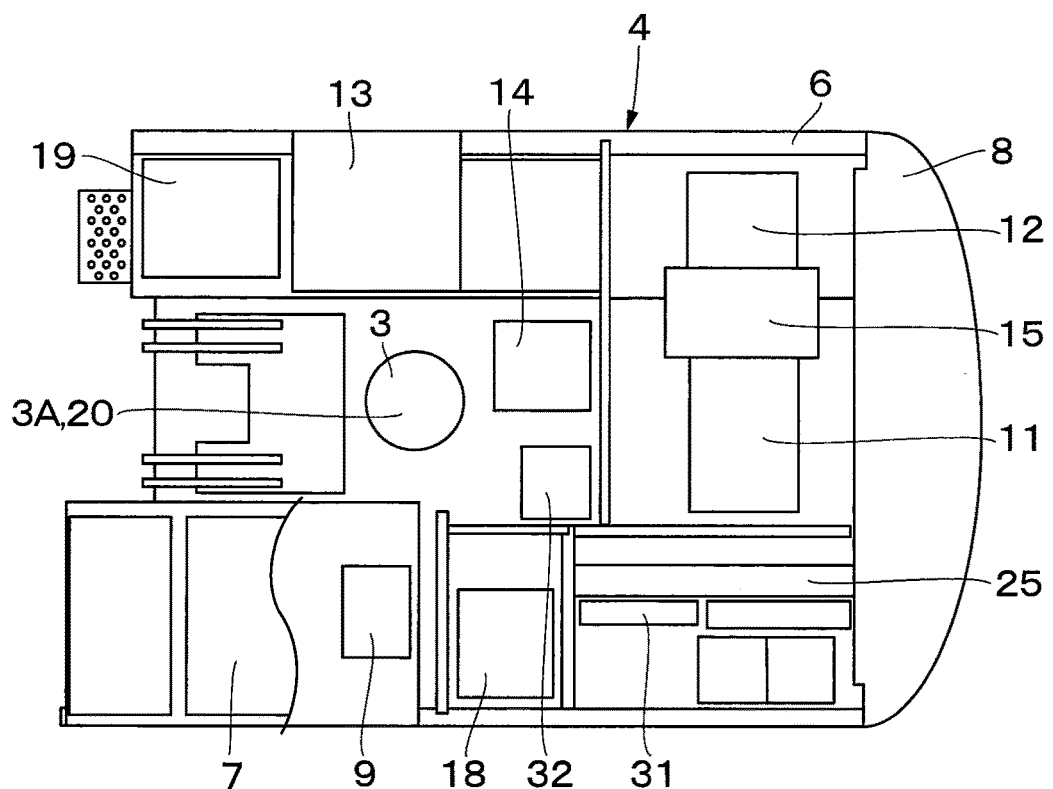
FIG. 3 is a plan view showing an engine, an assist power generation motor, an electricity storage device, an engine radiator, an electricity storage device radiator, a heating heat exchanger and the like, which are mounted on a revolving frame.
Figure 4:
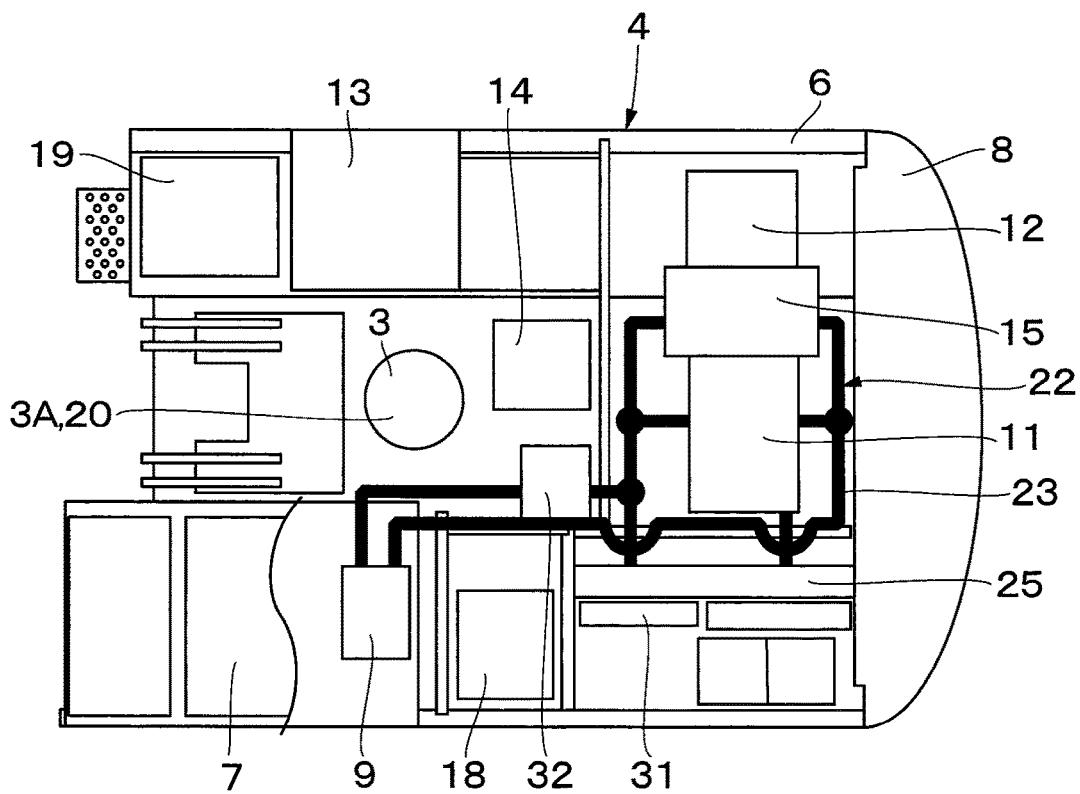
FIG. 4 is a plan view showing an engine cooling pipe line together with the engine and the like, in a position as similar to FIG. 3.
Figure 5:
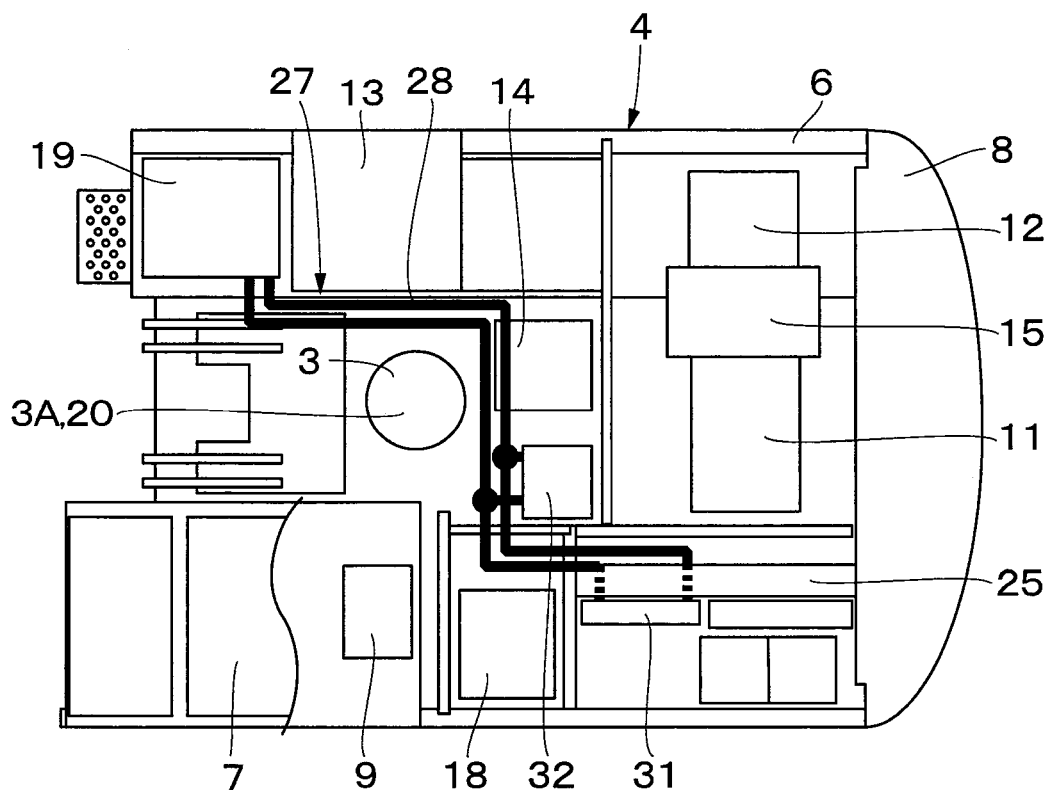
FIG. 5 is a plan view showing an electricity storage device cooling pipe line together with the electricity storage device and the like, in a position as similar to FIG. 3.

As shown in FIG. 3 to FIG. 5, the engine 11, the assist power generation motor 15 and the hydraulic pump 12 are positioned in front of the counterweight 8 and are provided on the revolving frame 6. An engine radiator 25 and an electricity storage device radiator 31 to be described later are positioned in the left side to the engine 11 (in other words, in back of the cab 7) and are disposed on the revolving frame 6. Meanwhile, the electricity storage device 19 to be described later is positioned in the right front side of the upper revolving structure 4, that is, in the opposite side to the cab 7 across the working mechanism 5 (the boom 5A thereof) and is disposed on the revolving frame 6. In addition, a heating heat exchanger 32 to be described later is positioned in front of the engine 11 and is disposed on the revolving frame 6.

An operator's seat (not shown) on which an operator sits is provided within the cab 7. Operation devices for operating the hydraulic excavator 1 (that is, a traveling lever/pedal operation device and a working lever operation device) are arranged on the periphery of the operator's seat. The operation device outputs a pilot signal (a pilot pressure) in response to an operation (a lever operation or a pedal operation) by the operator to the control valve device 14. As a result, the operator can operate (drive) the traveling hydraulic motors 2B, 2C, the cylinders 5D, 5E, 5F in the working mechanism 5 and the revolving hydraulic motor 3A in the revolving device 3.

Further, a heater core 9 (refer to FIG. 3 to FIG. 6) is disposed within the cab 7. The heater core 9 acts as a heat source of an air conditioner (not shown), that is, a heat source for heating air (blowing air) blowing out from the air conditioner (a heating apparatus). As described later, the heater core 9 is warmed (heated) by engine cooling water as a cooling medium (a heat-transfer medium) for cooling the engine 11. As a result, the inside of the cab 7 can be heated.

As shown in FIG. 2, the hydraulic excavator 1 is configured to mount thereon an electric system that controls the assist power generation motor 15 and the like, and a hydraulic system that controls operations of the working mechanism 5 and the like. Therefore, an explanation will be made of the system configuration in the hydraulic excavator 1 with reference to FIG. 2 as well as FIG. 1.

The engine 11 is mounted on the revolving frame 6, and is configured of an internal combustion engine such as a diesel engine. The hydraulic pump 12 and the assist power generation motor 15 to be described later are attached mechanically to the output side of the engine 11 for serial connection. The hydraulic pump 12 and the assist power generation motor 15 are driven and rotated by the engine 11. The engine 11 is controlled by an engine control unit (not shown) called "ECU".

Here, the engine 11 includes, an engine auxiliary 11A (refer to FIG. 6) incorporated in the engine 11 such as a fuel injection device (an injector), a turbocharger 11B (refer to FIG. 6) as a supercharger, and an exhaust gas purifying device 11C (refer to FIG. 6) for purifying an exhaust gas. The exhaust gas purifying device 11C is provided with, for example, an oxidation catalyst (DOC) that oxidizes and removes nitric oxide (NO), carbon oxide (CO) and hydrocarbon (HC) contained in an exhaust gas, and a particulate matter removal filter (DPF) that traps and removes particulate matter (PM) in an exhaust gas. In addition, the exhaust gas purifying device 11C is provided with, for example, a urea water injection device that injects urea aqueous solution toward an exhaust gas, and a selective reduction catalyst that selectively carries out a reduction reaction of nitric oxides (NOx) contained in an exhaust gas with ammonia generated from the urea aqueous solution to be decomposed into nitrogen and water. As described later, the engine auxiliary 11A, the turbocharger 11B and the exhaust gas purifying device 11C are cooled by engine cooling water as a cooling medium (a heat-transfer medium) for cooling the engine 11.

The hydraulic pump 12 is connected mechanically (that is, to be power transferable) to the engine 11. The hydraulic pump 12 can be driven by the torque of the engine 11 alone. In addition, the hydraulic pump 12 can be driven by a compound torque (a total torque) acquired by adding an assist torque of the assist power generation motor 15 to the torque of the engine 11. The hydraulic pump 12 is configured of, for example, a variable displacement hydraulic pump, more specifically a variable displacement hydraulic pump of a swash plate type, a bent axis type or a radial piston type. The hydraulic pump 12 pressurizes hydraulic oil reserved in the hydraulic oil tank 13, which is delivered to the traveling hydraulic motors 2B, 2C, the revolving hydraulic motor 3A, and the cylinders 5D to 5F of the working mechanism 5.

The hydraulic pump 12 is connected through the control valve device 14 to the traveling hydraulic motors 2B, 2C, revolving hydraulic motor 3A, and the cylinders 5D to 5F in the working mechanism 5. The traveling hydraulic motors 2B, 2C, the revolving hydraulic motor 3A, and the cylinders 5D to 5F in the working mechanism 5 are driven by the pressurized oil delivered from the hydraulic pump 12. The control valve device 14 is a control valve group formed of a plurality of directional control valves. The control valve device 14 distributes or discharges the hydraulic oil delivered from the hydraulic pump 12 to or from the traveling hydraulic motors 2B, 2C, the revolving hydraulic motor 3A, and the cylinders 5D to 5F in the working mechanism 5 in response to operations of the operation devices (the traveling lever/pedal operation device and the working lever operation device).

The assist power generation motor 15 as a power generation electric motor is connected mechanically to the engine 11. The assist power generation motor 15 is configured of, for example, a synchronous electric motor or the like. The assist power generation motor 15 is driven and rotated by the engine 11 to generate power, or assists in a drive of the engine 11 with supply of power. That is, the assist power generation motor 15 plays two roles of power generation of performing power supply to the electricity storage device 19 or the revolving electric motor 20 by acting as an electric motor using the engine 11 as a power source, and power running of assisting in the drive of the engine 11 by acting as a motor using power from the electricity storage device 19 or the revolving electric motor 20 as a power source. Accordingly, the assist torque of the assist power generation motor 15 is added to the torque of the engine 11 according to the state, and the hydraulic pump 12 is driven by these torques.

The assist power generation motor 15 is connected to a pair of DC buses 17A, 17B through a first inverter 16. The first inverter 16 configures an inverter unit 18 together with a second inverter 21 to be described later. As shown in FIG. 3 to FIG. 5, the inverter unit 18 is disposed in back of the cab 7 and in front of an electricity storage device radiator 31.

The first inverter 16 is configured using a plurality of switching elements such as a transistor and an insulating gate bipolar transistor (IGBT). An on/off operation of each of the switching elements in the first inverter 16 is controlled by a motor generator control unit (not shown) called "MGCU". As a result, generating power (regenerative power) at the power generation time and drive power at the power running time of the assist power generation motor 15 are controlled.

The DC buses 17A, 17B are paired at a positive electrode side and at a negative electrode side, and, for example, a DC voltage of approximately several hundreds V is applied thereto. At the power generation time of the assist power generation motor 15, the first inverter 16 converts AC power from the assist power generation motor 15 into DC power, which is supplied to the electricity storage device 19 or the revolving electric motor 20. At the power running time of the assist power generation motor 15, the first inverter 16 converts the DC power of the DC buses 17A, 17B into AC power, which is supplied to the assist power generation motor 15.

The electricity storage device 19 is connected to the DC buses 17A, 17B. That is, the electricity storage device 19 is connected electrically via the DC buses 17A, 17B to the assist power generation motor 15 and the revolving electric motor 20. The electricity storage device 19 is configured by, for example, an assembled battery (a lithium-ion battery unit) by electrically connecting a plurality of cells in the lithium-ion battery in series and in parallel, or in series or in parallel. The electricity storage device 19 stores therein the generating power supplied from the assist power generation motor 15, or supplies the stored power to the assist power generation motor 15.

That is, the electricity storage device 19 stores therein the power supplied from the assist power generation motor 15 at the power generation time of the assist power generation motor 15, and supplies the drive power toward the assist power generation motor 15 at the power running time (at the assist drive time) of the assist power generation motor 15. In addition, the electricity storage device 19 stores therein the regenerative power supplied from the revolving electric motor 20 at the regeneration time of the revolving electric motor 20 and supplies the drive power to the revolving electric motor 20 at the power running time of the revolving electric motor 20.

In this way, the electricity storage device 19 stores therein the power generated by the assist power generation motor 15 and the regenerative power generated by the revolving electric motor 20 at the revolution braking time of the hydraulic excavator 1. In this case, the electricity storage device 19 is controlled by a battery control unit (not shown) called "BCU". In addition, the electricity storage device 19 is provided with a temperature measuring device that detects a temperature of the electricity storage device 19, that is, a temperature sensor 19A (refer to FIG. 6). The temperature sensor 19A is connected to a control device 34 to be described later. The temperature sensor 19A outputs a signal corresponding to the detected temperature of the electricity storage device 19 to the control device 34.

The revolving electric motor 20 (revolving electric motor) is driven by the power from the assist power generation motor 15 or the electricity storage device 19. The revolving electric motor 20 is configured of, for example, a three-phase induction motor, and is disposed on the revolving frame 6 together with the revolving hydraulic motor 3A. The revolving electric motor 20 drives the revolving device 3 in cooperation with the revolving hydraulic motor 3A. That is, the revolving device 3 is driven by the compound torque of the revolving hydraulic motor 3A and the revolving electric motor 20 to drive and revolve the upper revolving structure 4.

The revolving electric motor 20 is connected to the DC buses 17A, 17B through the second inverter 21. The revolving electric motor 20 plays two roles of a power running operation of being driven/rotated by receiving the power from the electricity storage device 19 or the assist power generation motor 15, and regeneration of generating power with extra torque at the revolving braking time and storing the power in the electricity storage device 19. Therefore, the power from the assist power generation motor 15 and the like is supplied through the DC buses 17A, 17B to the revolving electric motor 20 at the power running time. Thereby, the revolving electric motor 20 generates rotational torque in response to an operation of the operation device by an operator to assist in a drive of the revolving hydraulic motor 3A to perform a revolving operation of the upper revolving structure 4.

The second inverter 21 is, as similar to the first inverter 16, configured using a plurality of switching elements. The on/off operation of each of the switching elements in the second inverter 21 is controlled by a revolving electric motor control unit (not shown) called "RMCU". At the power running time of the revolving electric motor 20, the second inverter 21 converts the DC power of the DC buses 17A, 17B into AC power, which will be supplied to the revolving electric motor 20. At the regeneration time of the revolving electric motor 20, the second inverter 21 converts the AC power from the revolving electric motor 20 into DC power, which will be supplied to the electricity storage device 19 and the like.

Next, an explanation will be made of a cooling system for the engine 11 and a cooling system for the electricity storage device 19 with reference to FIG. 1 and FIG. 2, as well as FIG. 3 to FIG. 7. In this case, FIG. 4 shows a layout of an engine cooling system 22 (an engine cooling pipe line 23). FIG. 5 shows a layout of an electricity storage device cooling system 27 (an electricity storage device cooling pipe line 28). The engine cooling system 22 and the electricity storage device cooling system 27 as shown in FIG. 6 are together mounted on the upper revolving structure 4 in the hydraulic excavator 1.

That is, the upper revolving structure 4 is provided with the engine cooling system 22 as a first heat-transfer medium circulation system and the electricity storage device cooling system 27 as a second heat-transfer medium circulation system disposed separately from the engine cooling system 22. The engine cooling system 22 is a cooling system for circulation of engine cooling water (a cooling medium) as an engine heat-transfer medium (a first heat-transfer medium). The electricity storage device cooling system 27 is a cooling system for circulation of electricity storage device cooling water (a cooling medium) as an electricity storage device heat-transfer medium (a second heat-transfer medium). In the embodiment, the engine cooling system 22 and the electricity storage device cooling system 27 are configured as different cooling systems in which different heat-transfer media (engine cooling water and electricity storage device cooling water) respectively flow.

It should be noted that the engine cooling water not only cools the engine 11 and the like, but also heats the heater core 9 (acts as a heat medium). However, since the engine cooling water also plays a role as a cooling medium for cooling the engine 11, it will be referred simply to as "engine cooling water" in the following explanation. In addition, the electricity storage device cooling water not only cools the electricity storage device 19 such that a temperature of the electricity storage device 19 does not go beyond an upper limit temperature, but also heats the electricity storage device 19 such that the temperature of the electricity storage device 19 does not go below a lower limit temperature (acts as a heat medium). However, since the electricity storage device cooling water plays a role as a cooling medium for cooling the electricity storage device 19, it will be referred simply to as "electricity storage device cooling water" in the following explanation. In other words, there are some cases of using the word of "cooling" including both the meanings of "cooling" and "heating" in the present specification.

Figure 6:
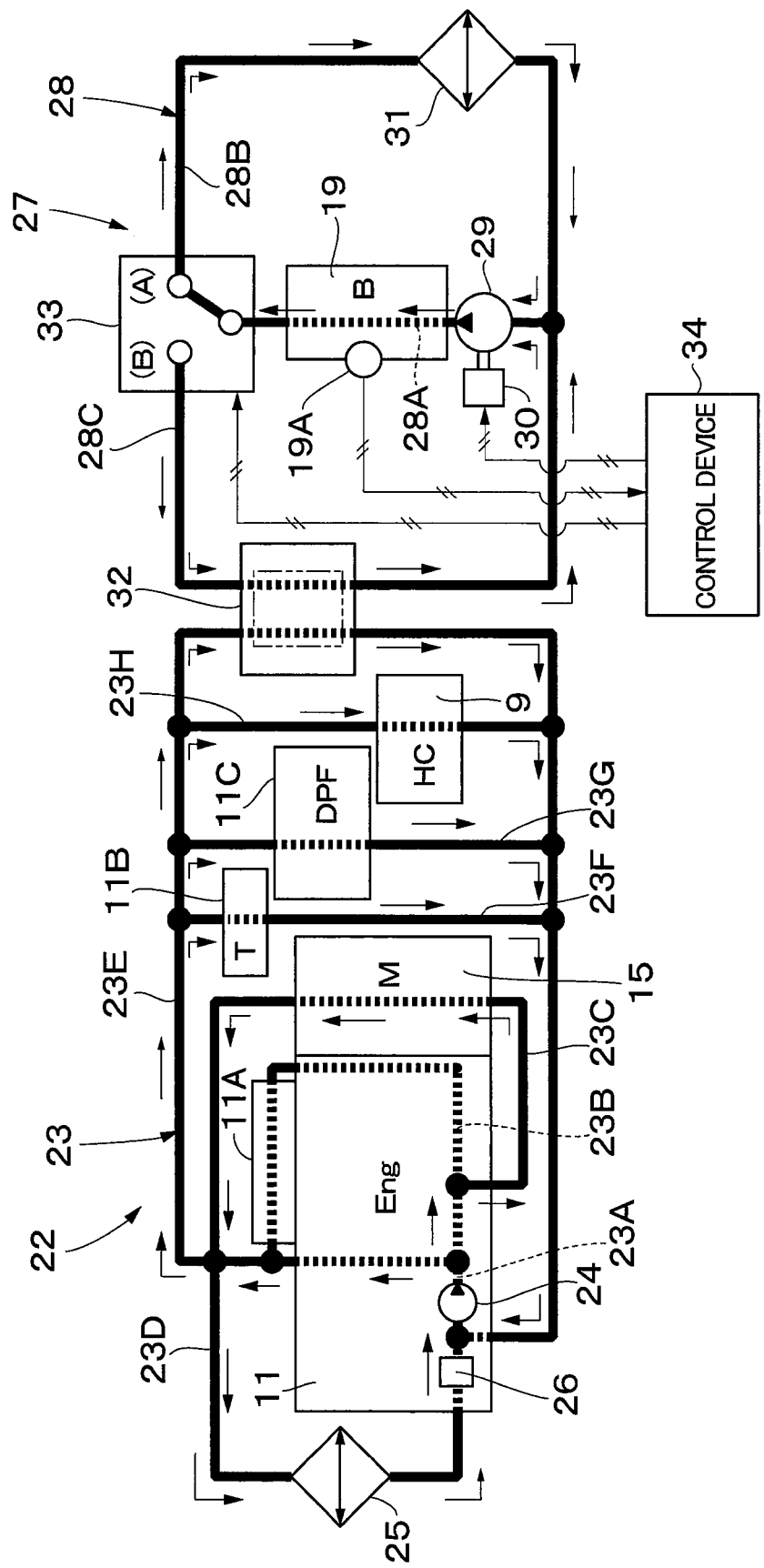
FIG. 6 is a cooling water circuit diagram (heat-transfer medium circuit diagram) showing an engine cooling system, an electricity storage device cooling system and a heating heat exchanger.

As shown in FIG. 6, the engine cooling system 22 is a temperature adjustment device that circulates engine cooling water to perform cooling (or heating) of the assist power generation motor 15 and the heater core 9 in addition to the engine 11 including the engine auxiliary 11A, the turbocharger 11B, the exhaust gas purifying device 11C, and the like. The engine cooling system 22 includes the engine 11, the assist power generation motor 15, the engine cooling pipe line 23, an engine water pump 24 as an engine cooling pump (a first pump), an engine radiator 25 as a first radiator, and a thermostat 26 as a control valve (a first valve).

The engine cooling water as a cooling medium for cooling the engine 11 circulates in the engine cooling pipe line 23. The engine cooling pipe line 23 has an engine passing pipe line 23A that is connected to a delivery side of the engine water pump 24 and passes through the engine 11. The engine passing pipe line 23A is configured of, for example, a water jacket of the engine 11, a hose and the like. The engine passing pipe line 23A is branched into an auxiliary pipe line 23B within the engine 11. The auxiliary pipe line 23B is connected via the engine auxiliary 11A to the downstream side of the engine passing pipe line 23A (downstream of the engine 11). The auxiliary pipe line 23B is branched into an electric motor pipe line 23C within the engine 11. The electric motor pipe line 23C is connected via the assist power generation motor 15 to the downstream side of the engine passing pipe line 23A (downstream of the engine 11). The downstream side of the engine passing pipe line 23A is branched into two pipe lines, that is, a radiator pipe line 23D and a heat exchanger pipe line 23E.

The radiator pipe line 23D is connected via the engine radiator 25 and the thermostat 26 to the suction port side of the engine water pump 24. The heat exchanger pipe line 23E is connected via a heating heat exchanger 32, which will be described later, to the suction port side of the engine water pump 24. In this case, the heat exchanger pipe line 23E is branched into three branch pipe lines upstream of the heating heat exchanger 32, that is, a supercharger branch pipe line 23F, a DPF branch pipe line 23G and a heater core branch pipe line 23H in order from the upstream side.

The supercharger branch pipe line 23F is connected via the turbocharger 11B to the downstream side of the heat exchanger pipe line 23E (downstream of the heating heat exchanger 32). The DPF branch pipe line 23G is connected via the exhaust gas purifying device 11C (DPF thereof) to the downstream side of the heat exchanger pipe line 23E (downstream of the heating heat exchanger 32). The heater core branch pipe line 23H is connected via the heater core 9 to the downstream side of the heat exchanger pipe line 23E (downstream of the heating heat exchanger 32).

The engine water pump 24 supplies (delivers) the engine cooling water to the engine cooling pipe line 23. That is, the engine water pump 24 circulates the engine cooling water between the engine 11 and the engine radiator 25 or between the engine 11 and the heating heat exchanger 32. The engine water pump 24 rotates based upon, for example, rotation of a crankshaft of the engine 11 to suction the engine cooling water of the radiator pipe line 23D and the heat exchanger pipe line 23E, or the radiator pipe line 23D or the heat exchanger pipe line 23E. The engine water pump 24 delivers the suctioned engine cooling water toward the engine passing pipe line 23A.

The engine cooling water delivered from the engine water pump 24 passes through the engine 11, the engine auxiliary 11A, the assist power generation motor 15, the turbocharger 11B, the exhaust gas purifying device 11C (the DPF thereof), the heater core 9 and the heating heat exchanger 32, and then, goes back to the suction port side of the engine water pump 24. In addition, when the thermostat 26 opens, the engine cooling water delivered from the engine water pump 24 passes through the engine radiator 25, and then, goes back to the suction port side of the engine water pump 24.

The engine radiator 25 is connected via the engine cooling pipe line 23 (more specifically, the radiator pipe line 23D) to the engine 11 (the engine passing pipe line 23A thereof). The engine radiator 25 performs heat release of the engine cooling water. That is, the engine radiator 25 is subjected to outside air (cooling air) suctioned by a cooling fan within an engine room to perform the cooling of the engine cooling water passing through the engine radiator 25. The engine cooling water cooled in the engine radiator 25 flows via the thermostat 26 to the suction port side of the engine water pump 24.

The thermostat 26 is disposed between the suction port of the engine water pump 24 and the engine radiator 25. The thermostat 26 acts as a control valve that controls a flow amount of the engine cooling water to the engine radiator 25. That is, the thermostat 26 is an opening-closing valve that opens/closes in accordance with a temperature of the engine cooling water, and closes when the temperature of the engine cooling water is low and opens when the temperature of the engine closing water is high. More specifically, the thermostat 26 opens at a predetermined temperature (for example, approximately 80° C. to 85° C.), which causes the engine cooling water to flow to the engine radiator 25-side. As a result, it is possible to maintain the temperature of the engine cooling water to be an appropriate temperature (for example, approximately 80° C.)

It should be noted that the heat exchanger pipe line 23E for circulating the engine cooling water to the heating heat exchanger 32 is branched from the upstream side of the engine radiator 25, and is connected via the heating heat exchanger 32 to the suction port of the engine water pump 24. In other words, the heat exchanger pipe line 23E establishes connection (bypass) between the upstream side of the engine radiator 25 and the downstream side of the thermostat 26. Therefore, the engine cooling water heated through the engine 11 or the like is supplied to the heating heat exchanger 32 regardless of a state (an opened state) of the thermostat 26, that is, even whether the thermostat 26 opens or closes.

The engine cooling system 22 can cool the engine 11, the assist power generation motor 15 and the like with circulation of the engine cooling water by the engine water pump 24. When the temperature of the engine cooling water reaches a high temperature by heat from the engine 11, the assist power generation motor 15 and the like, the thermostat 26 becomes in an opened state. As a result, the engine cooling water that has reached the high temperature is cooled by the engine radiator 25.

Here, the engine cooling water delivered from the engine water pump 24 is branched downstream of the engine water pump 24, one cooling the engine auxiliary 11A and the other cooling the assist power generation motor 15, and then, joining together downstream of the engine 11. Further, the joined engine cooling water is branched upstream of the engine radiator 25, which cools the turbocharger 11B and the exhaust gas purifying device 11C or heats the heater core 9 and the heating heat exchanger 32, and then joins downstream of the thermostat 26.

The electricity storage device cooling system 27 is a temperature adjustment device that circulates the electricity storage device cooling water to perform cooling (or heating) of the electricity storage device 19. The electricity storage device cooling system 27 includes the electricity storage device 19, an electricity storage device cooling pipe line 28, an electricity storage device water pump 29 as an electricity storage device cooling pump (a second pump), and an electricity storage device radiator 31 as a second radiator. Further, the electricity storage device cooling system 27 is provided with the heating heat exchanger 32 as a heat-transfer medium heat exchanger, a switching valve 33 as a second valve, and the control device 34.

The electricity storage device cooling water as a cooling medium for cooling the electricity storage device 19 (a lithium-ion battery thereof) flows in the electricity storage device cooling pipe line 28. The electricity storage device cooling pipe line 28 has an electricity storage device passing pipe line 28A that is connected to the delivery port side of the electricity storage device water pump 29 and passes through the electricity storage device 19. The switching valve 33 is connected to the downstream side of the electricity storage device passing pipe line 28A. That is, the electricity storage device passing pipe line 28A is branched into two pipe lines, that is, the radiator pipe line 28B and the heat exchanger pipe line 28C, via the switching valve 33.

The radiator pipe line 28B is connected via the switching valve 33 and the electricity storage device radiator 31 to the suction port side of the electricity storage device water pump 29. The heat exchanger pipe line 28C is connected via the switching valve 33 and the heating heat exchanger 32 to the suction port side of the electricity storage device water pump 29. In this way, the electricity storage device cooling pipe line 28 has the radiator pipe line 28B for connection of the electricity storage device water pump 29, the electricity storage device 19 and the electricity storage device radiator 31, and the heat exchanger pipe line 28C for connection of the electricity storage device water pump 29, the electricity storage device 19 and the heating heat exchanger 32.

The electricity storage device water pump 29 supplies (delivers) the electricity storage device cooling water to the electricity storage device cooling pipe line 28. That is, the electricity storage device water pump 29 circulates the electricity storage device cooling water between the electricity storage device 19 and the electricity storage device radiator 31 and/or the heating heat exchanger 32. The electricity storage device water pump 29 is driven and rotated by, for example, a pump electric motor 30 rotation and stop of which are controlled based upon an instruction (power supply) from the control device 34. That is, the electricity storage device water pump 29 is configured as an electric pump.

The electricity storage device water pump 29 rotates by the pump electric motor 30 to suction the electricity storage device cooling water in the radiator pipe line 28B or the heat exchanger pipe line 28C. The electricity storage device water pump 29 delivers the suctioned electricity storage device cooling water toward the electricity storage device passing pipe line 28A. The electricity storage device cooling water delivered from the electricity storage device water pump 29 passes through the electricity storage device 19 and the electricity storage device radiator 31 or passes through the electricity storage device 19 and the heating heat exchanger 32 in response to a switch position of the switching valve 33, and then, goes back to the suction port side of the electricity storage device water pump 29.

The electricity storage device radiator 31 is connected via the electricity storage device cooling pipe line 28 (more specifically, the radiator pipe line 28B) to the electricity storage device 19 (the electricity storage device passing pipe line 28A thereof). The electricity storage device radiator 31 performs heat release of the electricity storage device cooling water. That is, the electricity storage device radiator 31 is subjected to outside air (cooling air) suctioned by the cooling fan within the engine room to perform the cooling of the electricity storage device cooling water passing through the electricity storage device radiator 31. The electricity storage device cooling water cooled in the electricity storage device radiator 31 flows to the suction port side of the electricity storage device water pump 29.

The embodiment is further provided with the heating heat exchanger 32 that performs heat exchange between the engine cooling water and the electricity storage device cooling water. In this case, the heating heat exchanger 32 is disposed in the halfway of the engine cooling pipe line 23 in the engine cooling system 22 (more specifically, in the halfway of the heat exchanger pipe line 23E), and in the halfway of the electricity storage device cooling pipe line 28 in the electricity storage device cooling system 27 (more specifically, in the halfway of the heat exchanger pipe line 28C). Thereby, the heating heat exchanger 32 configures the engine cooling system 22, and also configures the electricity storage device cooling system 27.

The heating heat exchanger 32 may be configured of a heat exchanger, such as a plate-type heat exchanger or a double pipe-type heat exchanger, that is, a heat exchanger that performs heat exchange between a liquid and a liquid. The heating heat exchanger 32 uses heat of the engine cooling water flowing in the heat exchanger pipe line 23E to heat the electricity storage device cooling water flowing in the heat exchanger pipe line 28C. In this case, when the electricity storage device 19 is configured of a lithium-ion battery, for example, a temperature of the electricity storage device cooling water is preferably approximately 20° C. to 30° C. On the other hand, a temperature of the engine cooling water becomes approximately 80° C. to 99° C. Therefore, the selection and heat design of the heating heat exchanger 32 is performed such that the temperature of the electricity storage device cooling water becomes 20° C. to 30° C. by the engine cooling water. By setting the heating heat exchanger 32 in this way, a temperature increasing rate of the electricity storage device cooling water to be used for heating the electricity storage device 19 can be made desirable (appropriate).

The switching valve 33 is disposed downstream of the electricity storage device 19, that is, in the downstream side of the electricity storage device passing pipe line 28A. In other words, the switching valve 33 is disposed between the electricity storage device 19 and the electricity storage device radiator 31, and between the electricity storage device 19 and the heating heat exchanger 32. The switching valve 33 is to switch the flow of the electricity storage device cooling water to any one of the radiator pipe line 28B and the heat exchanger pipe line 28C based upon a temperature of the electricity storage device 19.

The switching valve 33 is configured of an electric switching valve, such as a magnetic valve (a magnetic switching valve) having a solenoid and the like, and a switch position thereof is switched by the control device 34. The switching valve 33 is switched into anyone of a switch position (A) for connection of the electricity storage device passing pipe line 28A to the electricity storage device radiator 31-side and a switch position (B) for connection of the electricity storage device passing pipe line 28A to the heating heat exchanger 32-side. In this case, the switching valve 33 is switched to the switch position (A) when the temperature of the electricity storage device cooling water is high (for example, when the temperature of the electricity storage device 19 is higher than 30° C.). Meanwhile, the switching valve 33 is switched to the switch position (B) when the temperature of the electricity storage device cooling water is low (for example, when the temperature of the electricity storage device 19 is lower than 20° C.).

The control device 34 is a control unit that switches the switching valve 33 to any one of the switch position (A) and the switch position (B), as well as a control unit that drives and stops the electricity storage device water pump 29 (the pump electric motor 30). The control device 34 includes, for example, a microcomputer, a drive circuit and a power source circuit. The microcomputer has a calculation unit (CPU), for example, and further, memories (none of them is shown) composed of a flash memory, a ROM, a RAM, an EEPROM, and the like. The memory stores therein a processing program for executing a processing flow shown in FIG. 7 to be described later (that is, a processing program to be used in control processing of the switching valve 33 and the pump electric motor 30), for example.

An input side of the control device 34 is connected to the temperature sensor 19A of the electricity storage device 19. An output side of the control device 34 is connected to the switching valve 33 and the pump electric motor 30. The control device 34 performs switch of the switch position of the switching valve 33 and the drive and stop of the pump electric motor 30, based upon a temperature of the electricity storage device 19 (a temperature of a lithium-ion battery) to be detected by the temperature sensor 19A. It should be noted that the control processing in FIG. 7 to be executed in the control device 34 will be in detail explained later.

The electricity storage device cooling system 27 can cool the electricity storage device 19 with circulation of the electricity storage device cooling water by the electricity storage device water pump 29. At this time, the switching valve 33 is switched to the switch position (A). Therefore, the electricity storage device cooling water a temperature of which has increased by the heat of the electricity storage device 19 can be cooled in the electricity storage device radiator 31. In addition, the electricity storage device cooling system 27 can heat the electricity storage device 19 with circulation of the electricity storage device cooling water by the electricity storage device water pump 29. At this time, the switching valve 33 is switched to the switch position (B). Therefore, the electricity storage device cooling water can be heated by heat exchange with the engine cooling water in the engine cooling system 22 in the heating heat exchanger 32.

The electricity storage device cooling water heated in the heating heat exchanger 32 flows via the electricity storage device water pump 29 to the electricity storage device 19, whereby the electricity storage device 19 can be heated. In this way, the switching valve 33 is switched to the switch position (A) to cool the electricity storage device 19, and the switching valve 33 is switched to the switch position (B) to heat the electricity storage device 19, thereby, being capable of performing temperature control of the electricity storage device 19. As a result, it is possible to maintain the temperature of the electricity storage device cooling water to an appropriate temperature (for example, approximately 20° C. to 30° C.)

That is, according to the embodiment, the electricity storage device 19 the performance of which is degraded under a low-temperature environment can be heated using the exhaust heat of the engine 11. In this case, in the embodiment the engine cooling system 22 and the electricity storage device cooling system 27 are separately arranged, and also the heating heat exchanger 32 is provided to perform the heat exchange between the engine cooling water in the engine cooling system 22 and the electricity storage device cooling water in the electricity storage device cooling system 27. In other words, the engine cooling system 22 (the engine cooling pipe line 23) is disposed away from the electricity storage device 19, and the engine cooling water in the engine cooling system 22 does not pass through the electricity storage device 19. That is, the electricity storage device 19 is not heated directly by the engine cooling water in the engine cooling system 22. The electricity storage device 19 is heated by the electricity storage device cooling water heated by the engine cooling water in the heating heat exchanger 32.

It should be noted that although not illustrated, the upper revolving structure 4 is provided with an inverter cooling system as a third heat-transfer medium circulation system besides the engine cooling system 22 and the electricity storage device cooling system 27. The inverter cooling system is a temperature adjustment device that performs cooling of the first inverter 16, the second inverter 21, and further, the revolving electric motor 20 as needed. The inverter cooling system includes, for example, the inverters 16, 21, an inverter cooling pipe line in which inverter cooling water (cooling medium heat-transfer medium for inverter) flows, an inverter cooling pump that delivers the inverter cooling water to the inverter cooling pipe line, and an inverter radiator that performs heat release of the inverter cooling water. The inverter cooling system can cool the first inverter 16, the second inverter 21, and further, the revolving electric motor 20 as needed, by circulating the inverter cooling water by the inverter cooling pump.

The hydraulic excavator 1 according to the embodiment has the configuration as described above, and next, an operation thereof will be explained.

When an operator who has got in the cab 7 activates the engine 11, the hydraulic pump 12 and the assist power generation motor 15 are driven by the engine 11. Thereby, the pressurized oil delivered from the hydraulic pump 12 is delivered to the traveling hydraulic motors 2B, 2C, the revolving hydraulic motor 3A, and the boom cylinder 5D, the arm cylinder 5E and the bucket cylinder 5F in the working mechanism 5 in response to the lever operation and the pedal operation of the operation devices (the traveling lever/pedal operation device and the working lever operation device) provided within the cab 7. Thereby, the hydraulic excavator 1 can perform the traveling operation by the lower traveling structure 2, the revolving operation of the upper revolving structure 4, and the excavating operation by the working mechanism 5.

Here, for example, when the output torque of the engine 11 is larger than the drive torque of the hydraulic pump 12 at the operation time of the hydraulic excavator 1, the assist power generation motor 15 is driven as an electric motor by the extra torque. Thereby, the assist power generation motor 15 generates AC power, and the AC power is converted into DC power by the first inverter 16, which is stored in the electricity storage device 19. Meanwhile, when the output torque of the engine 11 is smaller than the drive torque of the hydraulic pump 12, the assist power generation motor 15 is driven as an electric motor by the power from electricity storage device 19, which assists in a drive of the engine 11.

At this time, the engine cooling system 22 can cool the engine 11, the engine auxiliary 11A, the turbocharger 11B, the exhaust gas purifying device 11C and the assist power generation motor 15 with circulation of the engine cooling water within the engine cooling system 22 by the engine water pump 24. When the temperature of the engine cooling water is low, since the thermostat 26 becomes in a closed state, the engine cooling water does not flow to the engine radiator 25-side. When the temperature of the engine cooling water exceeds a predetermined temperature, the thermostat 26 starts to close and the engine cooling water flows to the engine radiator 25-side, thereby, cooling the engine cooling water.

As a result, the temperature of the engine cooling water is maintained to 80° C. to 99° C., for example. In addition, the engine cooling water is supplied to the heater core 9. The air conditioner within the cab 7 can heat the inside of the cab 7 using the engine cooling water flowing in the heater core 9 as a heat source. Further, the engine cooling water is supplied to the heating heat exchanger 32 regardless of a state of the thermostat 26. In the heating heat exchanger 32, the electricity storage device cooling water is heated by the engine cooling water.

Meanwhile, the electricity storage device cooling system 27 is configured such that the electricity storage device cooling water circulates within the electricity storage device cooling system 27 by the electricity storage device water pump 29. For example, when the switching valve 33 is switched to the switch position (A) and the pump electric motor 30 is driven by the control device 34, the electricity storage device cooling water flows from the electricity storage device 19 to the electricity storage device radiator 31-side. Thereby, the electricity storage device cooling water cooled in the electricity storage device radiator 31 is supplied to the electricity storage device 19, and can cool the electricity storage device 19. Meanwhile, when the switching valve 33 is switched to the switch position (B) and the pump electric motor 30 is driven by the control device 34, the electricity storage device cooling water flows from the electricity storage device 19 to the heating heat exchanger 32-side. Thereby, the electricity storage device cooling water heated in the heating heat exchanger 32 is supplied to the electricity storage device 19, and can heat the electricity storage device 19.

Next, an explanation will be made of the processing of the switching control in the switching valve 33 and the drive and stop control of the electricity storage device water pump 29 (pump electric motor 30), which will be executed by the control device 34, with reference to a flow chart in FIG. 7. It should be noted that the processing in FIG. 7 is repeatedly executed for each predetermined control time (in a predetermined sampling frequency) while power is being supplied to the control device 34, for example.

Figure 7:
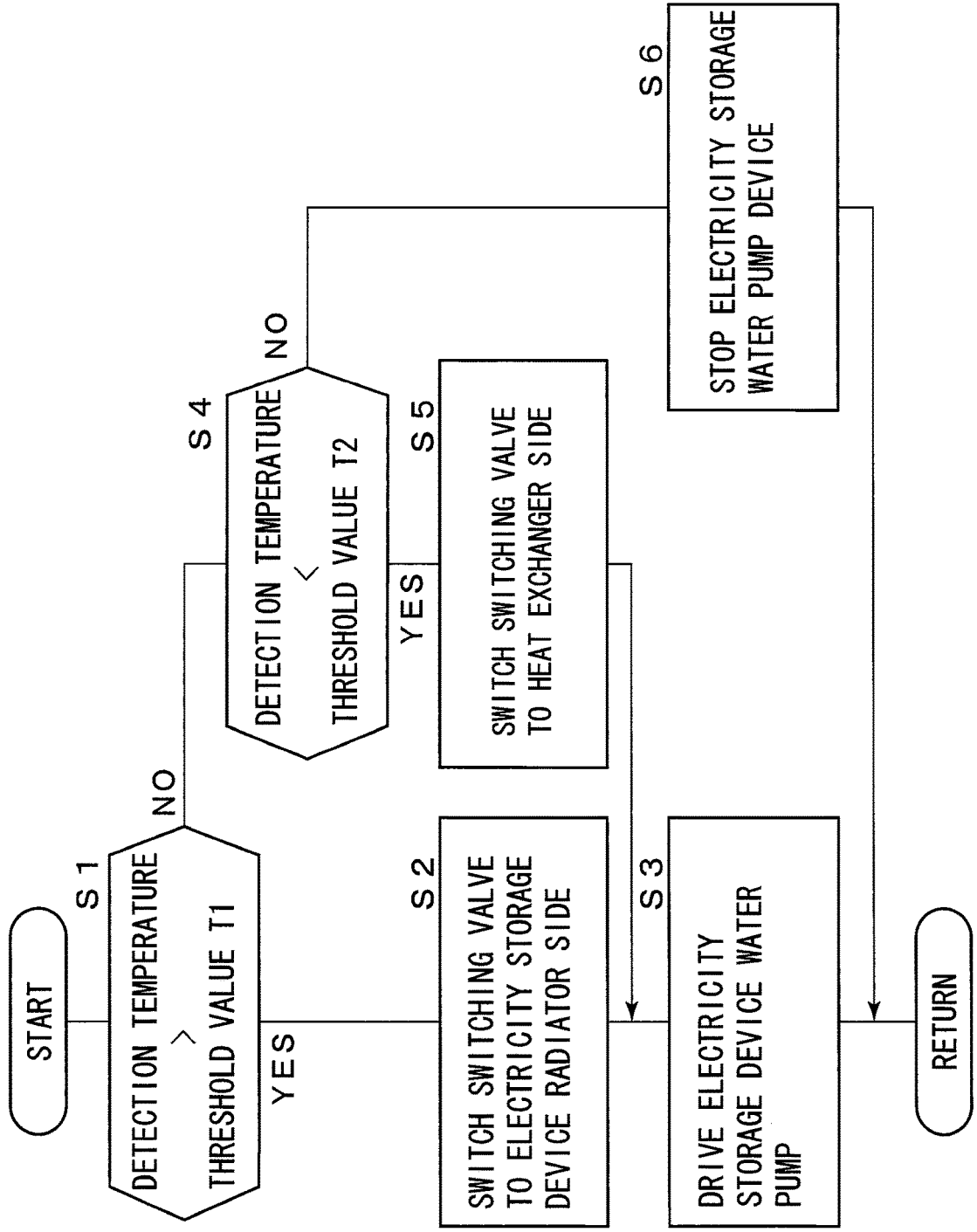
FIG. 7 is a flow chart showing a control content by a control device in FIG. 6.

By turning on an accessary switch or starting-up the engine 11 (turning on an ignition switch), power starts to be supplied to the control device 34 to start the processing operation in FIG. 7. The control device 34 determines in S1 whether or not a temperature (detection temperature) detected by the temperature sensor 19A in the electricity storage device 19 is higher than a first predetermined threshold value T1. That is, in S1 it is determined whether or not the cooling of the electricity storage device 19 is necessary. The first threshold value T1 may be set as, for example, a temperature in which the cooling of the electricity storage device 19 should start. The first threshold value T1 is a value that is set in accordance with a specification of the electricity storage device 19, an upper limit temperature and a lower limit temperature of the electricity storage device 19, and the like. For example, in a case where the electricity storage device 19 is configured of a lithium-ion battery, the electricity storage device 19 is preferably used at a normal temperature (for example, 20° C. to 30° C.) in terms of the characteristics of the lithium-ion battery. In this case, the first threshold value T1 may be set as 30° C., for example.

In a case where "YES" is determined in S1, that is, the detection temperature is higher than the first threshold value T1, the process goes to S2. In this case, it is estimated that the cooling of the electricity storage device 19 is necessary. Therefore, in S2 the switching valve 33 is switched to the electricity storage device radiator 31-side. That is, in S2 the switching valve 33 is switched to the switch position (A). In addition, the process goes to subsequent S3, wherein the electricity storage device water pump 29 is driven. That is, in S3 the pump electric motor 30 is driven. When the electricity storage device water pump 29 is driven in S3, the process returns. That is, the process goes back to START via RETURN, and the processes in S1 and subsequent thereto are repeated.

Meanwhile, in a case where "NO" is determined in S1, that is, the detection temperature is equal to or lower than the first threshold value T1, the process goes to S4. In S4, it is determined whether or not the detection temperature is lower than a second preset threshold value T2. That is, in S4 it is determined whether or not the heating (warming-up) of the electricity storage device 19 is necessary. The second threshold value T2 may be set as, for example, a temperature in which the heating of the electricity storage device 19 should start. The second threshold value T2, as similar to the first threshold value T1, is a value that is set in accordance with a specification of the electricity storage device 19, an upper limit temperature and a lower limit temperature of the electricity storage device 19, and the like. For example, in a case where the electricity storage device 19 is configured of a lithium-ion battery, the second threshold value T2 may be set as 20° C., for example.

In a case where "YES" is determined in S4, that is, the detection temperature is lower than the second threshold value T2, the process goes to S5. In this case, it is estimated that the heating of the electricity storage device 19 is necessary. Therefore, in S5, the switching valve 33 is switched to the heating heat exchanger 32-side. That is, in S5 the switching valve 33 is switched to the switch position (B). In addition, the process goes to subsequent S3, wherein the electricity storage device water pump 29 (the pump electric motor 30) is driven, and the process returns. On the other hand, in a case where "NO" is determined in S4, that is, the detection temperature is equal to or more than the second threshold value T2, the process goes to S6. In this case, it is estimated that the cooling and the heating of the electricity storage device 19 are not necessary. Therefore, in S6 the electricity storage device water pump 29 (the pump electric motor 30) is stopped, and the process returns.

In this way, according to the embodiment, in a case where the temperature of the electricity storage device 19 is higher than the first threshold value T1, it is determined that the cooling of the electricity storage device 19 is necessary, and the switching valve 33 is switched to the switch position (A) and the electricity storage device water pump 29 is driven. In this case, the electricity storage device cooling water delivered from the electricity storage device water pump 29 passes through the electricity storage device 19, the switching valve 33 and the electricity storage device radiator 31, and goes back to the electricity storage device water pump 29. As a result, it is possible to perform the cooling of the electricity storage device 19.

Meanwhile, in a case where the temperature of the electricity storage device 19 is lower than the second threshold value T2, it is determined that the warming-up of the electricity storage device 19 is necessary, and the switching valve 33 is switched to the switch position (B) and the electricity storage device water pump 29 is driven. In this case, the electricity storage device cooling water delivered from the electricity storage device water pump 29 passes through the electricity storage device 19, the switching valve 33 and the heating heat exchanger 32, and goes back to the electricity storage device water pump 29. The engine cooling water is all the time supplied to the heating heat exchanger 32, and the electricity storage device cooling water in the electricity storage device cooling system 27 is heated by the engine cooling water in the engine cooling system 22. As a result, it is possible to heat the electricity storage device 19.

In a case where the temperature of the electricity storage device 19 is equal to or lower than the first threshold value T1 and is equal to or more than the second threshold value T2, it is determined that the electricity storage device 19 is in a state where the heating as well as the cooling are not necessary, and the electricity storage device water pump 29 is stopped. In this case, the electricity storage device cooling water does not circulate in the electricity storage device cooling system 27.

As described above, according to the embodiment, the engine cooling system 22 and the electricity storage device cooling system 27 are respectively configured as different cooling systems where different heat-transfer media (the engine cooling water and the electricity storage device cooling water) respectively flow. That is, the engine cooling system 22 and the electricity storage device cooling system 27 are separated as different circulation systems, respectively. Therefore, each of the cooling systems can be configured in a simple manner. For example, as pipe line layouts are shown in FIG. 4 and FIG. 5, since it is possible to shorten a pathway (a length of the pipe line) of each of the cooling systems, it is possible to reduce a risk of the leakage of each of the heat-transfer media (the engine cooling water and the electricity storage device cooling water).

In this case, for example, even when the leakage of the heat-transfer medium (the electricity storage device cooling water) occurs in the electricity storage device cooling system 27, the engine cooling system 22 can be prevented from being unable of performing the cooling in a chain. Thereby, it is possible to reduce a possibility of failures in various kinds of equipment devices (the engine 11, the engine auxiliary 11A, the turbocharger 11B, the exhaust gas purifying device 11C and the like) that are cooled in the engine cooling system 22.

Further, since there is provided the heat-transfer medium heat exchanger (the heating heat exchanger 32) that performs the heat exchange between the engine heat-transfer medium (the engine cooling water) and the electricity storage device heat-transfer medium (the electricity storage device cooling water), it is possible to easily adjust the temperature of the heat-transfer medium (the electricity storage device cooling water) for warming-up the electricity storage device 19. That is, by using the heat-transfer medium heat exchanger (the heating heat exchanger 32), it is possible to suppress a temperature increasing rate of the heat-transfer medium (the electricity storage device cooling water) to be used for warming-up the electricity storage device 19 from becoming in an excessively high state.

According to the embodiment, the electricity storage device cooling system 27 has the switching valve 33 that switches the flow of the electricity storage device heat-transfer medium (the electricity storage device cooling water) to any one of the radiator pipe line 28B and the heat exchanger pipe line 28C, based upon the temperature of the electricity storage device 19. Therefore, it is possible to switch the cooling and the heating (the warming-up) of the electricity storage device 19 by switching the switching valve 33 to the switch position (A) or the switch position (B) based upon the temperature of the electricity storage device 19.

According to the embodiment, the engine heat-transfer medium (the engine cooling water) is supplied to the heat-transfer medium heat exchanger (the heating heat exchanger 32) regardless of a state of the control valve (the thermostat 26) that controls a flow amount of the engine heat-transfer medium (the engine cooling water) in the engine cooling system 22. Therefore, it is possible to all the time supply the engine heat-transfer medium (the engine cooling water) heated by the engine 11 to the heat-transfer medium heat exchanger (the heating heat exchanger 32). As a result, it is possible to perform the heating of the electricity storage device heat-transfer medium (the electricity storage device cooling water) in the heat-transfer medium heat exchanger (the heating heat exchanger 32) regardless of the state (an opened/closed state) of the control valve (the thermostat 26) in the engine cooling system 22.

It should be noted that the embodiment is explained by taking a case where the temperature of the electricity storage device 19 is configured to be detected by the temperature sensor 19A, as an example. However, not limited thereto, for example, a cooling water temperature sensor that detects a temperature of the electricity storage device cooling water may be disposed as a sensor for detecting a temperature of an electricity device. That is, the temperature of the electricity storage device may be found by directly detecting (measuring) a temperature of the electricity storage device or by detecting or estimating a state amount (for example, a temperature of electricity storage device cooling water or a resistance of an electricity storage device) having a correlative relationship with a temperature of the electricity storage device or the like. In this case, the state amount having the correlative relationship with the temperature of the electricity storage device may be used as the temperature of the electricity storage device (a state amount corresponding thereto) as it is.

The embodiment is explained by taking a case where the electricity storage device 19 is configured of the lithium-ion battery as an example. However, not limited thereto, the electricity storage device may be configured of any one of various kinds of secondary batteries capable of supplying necessary power, such as a nickel cadmium battery or a nickel-hydrogen battery. Further, a step-up and-down device such as a DC-DC converter may be disposed between an electricity storage device and a DC bus.

The embodiment is explained by taking the configuration provided with the revolving hydraulic motor 3A and the revolving electric motor 20 as the revolving device that revolves the upper revolving structure 4, as an example. However, not limited thereto, for example, the drive source of the revolving device may be configured of a hydraulic motor alone or an electric motor alone.

The embodiment is explained by taking the hybrid hydraulic excavator 1 of a crawler type as a hybrid working machine, as an example. However, not limited thereto, the present invention can be widely applied to various kinds of working machines such as construction machines of a wheel type hydraulic excavator, a hydraulic crane and the like, and working vehicles of a wheel loader, a fork lift, a dump truck and the like, or the like.

DESCRIPTION OF REFERENCE NUMERALS

1: Hydraulic excavator (Hybrid working machine)
2: Lower traveling structure (Vehicle body)
4: Upper revolving structure (Vehicle body)
5: Working mechanism
11: Engine
15: Assist power generation motor (Electric motor)
19: Electricity storage device
22: Engine cooling system
23: Engine cooling pipe line
24: Engine water pump (Engine cooling pump)
25: Engine radiator
26: Thermostat (Control valve)
27: Electricity storage device cooling system
28: Electricity storage device cooling pipe line
28B: Radiator pipe line
28C: Heat exchanger pipe line
29: Electricity storage device water pump (Electricity storage device cooling pump)
31: Electricity storage device radiator
32: Heating heat exchanger (Heat-transfer medium heat exchanger)
33: Switching valve

The invention claimed is:

1. A hybrid working machine comprising:
an automotive vehicle body attached to a working mechanism;
an engine mounted on the vehicle body;
an electric motor that is driven and rotated by the engine to generate power or assists in a drive of the engine with supply of power;
an electricity storage device that stores the power generated by the electric motor or supplies the stored power to the electric motor;
an engine cooling pipe line to convey an engine heat-transfer medium for cooling the engine;
an engine cooling pump that delivers the engine heat-transfer medium to the engine cooling pipe line;
an engine radiator that is connected through the engine cooling pipe line to the engine to perform heat release of the engine heat-transfer medium;
an electricity storage device cooling pipe line to convey an electricity storage device heat-transfer medium for cooling the electricity storage device;
an electricity storage device cooling pump that delivers the electricity storage device heat-transfer medium to the electricity storage device cooling pipe line; and
an electricity storage device radiator that is connected through the electricity storage device cooling pipe line to the electricity storage device to perform heat release of the electricity storage device heat-transfer medium, wherein
an engine cooling system including the engine, the engine cooling pipe line, the engine cooling pump and the engine radiator, and an electricity storage device cooling system including the electricity storage device, the electricity storage device cooling pipe line, the electricity storage device cooling pump and the electricity storage device radiator are configured as different cooling systems to respectively convey different heat-transfer media;
a heat-transfer medium heat exchanger is provided for performing heat exchange between the engine heat-transfer medium and the electricity storage device heat-transfer medium; and
the electricity storage device cooling pipe line includes:
a radiator pipe line for connection of the electricity storage device cooling pump, the electricity storage device and the electricity storage device radiator; and
a heat exchanger pipe line for connection of the electricity storage device cooling pump, the electricity storage device and the heat-transfer medium heat exchanger, and
the electricity storage device cooling system includes a switching valve that switches the flow of the electricity storage device heat-transfer medium to any one of the radiator pipe line and the heat exchanger pipe line, based upon a temperature of the electricity storage device.

2. The hybrid working machine according to claim 1, wherein
the engine cooling system includes a control valve that controls a flow amount of the engine heat-transfer medium to the engine radiator, and
the engine heat-transfer medium is supplied to the heat-transfer medium heat exchanger regardless of a state of the control valve.

* * * * *